US012236813B2

(12) United States Patent
Lv et al.

(10) Patent No.: US 12,236,813 B2
(45) Date of Patent: Feb. 25, 2025

(54) DISPLAY PANEL, DRIVING METHOD THEREOF AND DISPLAY DEVICE

(71) Applicant: BOE TECHNOLOGY GROUP CO., LTD., Beijing (CN)

(72) Inventors: Yaoyu Lv, Beijing (CN); Feng Gao, Beijing (CN); Yachong Xue, Beijing (CN); Jiankang Sun, Beijing (CN); Lili Chen, Beijing (CN); Hao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,480

(22) PCT Filed: Oct. 28, 2021

(86) PCT No.: PCT/CN2021/127168

§ 371 (c)(1),
(2) Date: Sep. 22, 2022

(87) PCT Pub. No.: WO2022/199020

PCT Pub. Date: Sep. 29, 2022

(65) Prior Publication Data

US 2024/0221548 A1 Jul. 4, 2024

(30) Foreign Application Priority Data

Mar. 22, 2021 (CN) ......................... 202110301734.3

(51) Int. Cl.
*G09G 3/00* (2006.01)
*G09G 3/32* (2016.01)

(52) U.S. Cl.
CPC ............... *G09G 3/001* (2013.01); *G09G 3/32* (2013.01); *G09G 2300/0452* (2013.01); *G09G 2330/021* (2013.01); *G09G 2340/0435* (2013.01)

(58) Field of Classification Search
CPC .. G09G 3/001; G09G 3/32; G09G 2300/0452; G09G 2330/021; G09G 2340/0435
See application file for complete search history.

(56) References Cited

U.S. PATENT DOCUMENTS

2010/0123694 A1* 5/2010 Cok ......................... G09G 3/20 345/206
2011/0181569 A1* 7/2011 Liu ......................... G09G 3/344 345/204

(Continued)

FOREIGN PATENT DOCUMENTS

CN 102282675 A 12/2011
CN 104332131 A 2/2015

(Continued)

OTHER PUBLICATIONS

China Patent Office, CN202110301734.3 First Office Action issued on Dec. 1, 2021.

(Continued)

*Primary Examiner* — Kenneth Bukowski
(74) *Attorney, Agent, or Firm* — HOUTTEMAN LAW LLC

(57) ABSTRACT

The present disclosure provides a display panel, a driving method thereof and a display device, belongs to the field of display technology, and can at least partially solve the problem that the transmission bandwidth required by the conventional rotational display device is large during the display. The display panel of the present disclosure includes: the pixel units arranged in an array, each pixel unit including at least two sub-pixels; and a plurality of pixel driving chips (Continued)

in one-to-one correspondence with the plurality of pixel units, the pixel driving chip being configured to provide a driving signal to a corresponding pixel unit.

17 Claims, 4 Drawing Sheets

(56) References Cited

U.S. PATENT DOCUMENTS

| | | | | |
|---|---|---|---|---|
| 2017/0011702 | A1* | 1/2017 | Yamagishi | G09G 3/3685 |
| 2017/0187976 | A1* | 6/2017 | Cok | H04N 25/74 |
| 2017/0256522 | A1* | 9/2017 | Cok | H01L 25/50 |
| 2019/0265478 | A1* | 8/2019 | Cok | G02B 27/0172 |
| 2020/0251066 | A1* | 8/2020 | Hu | G09G 3/3677 |
| 2020/0379704 | A1* | 12/2020 | Ren | G06F 3/0412 |
| 2021/0193067 | A1* | 6/2021 | Shao | G09G 3/3685 |
| 2021/0400253 | A1* | 12/2021 | Sun | G09G 3/008 |
| 2022/0122519 | A1* | 4/2022 | Bower | H01L 25/167 |

FOREIGN PATENT DOCUMENTS

| | | | |
|---|---|---|---|
| CN | 108492796 | A | 9/2018 |
| CN | 113053300 | A | 6/2021 |
| DE | 202007018520 | U1 | 10/2008 |
| WO | WO 2021046757 | A1 | 3/2021 |

OTHER PUBLICATIONS

China Patent Office, CN202110301734.3 Second Office Action issued on Jun. 23, 2022.

China Patent Office, CN202110301734.3 Decision of Rejection issued on Jan. 13, 2023.

* cited by examiner

DISPLAY PANEL, DRIVING METHOD THEREOF AND DISPLAY DEVICE

CROSS-REFERENCE TO RELATED APPLICATION

This is a National Phase Application filed under 35 U.S.C. 371 as a national stage of PCT/CN2021/127168, filed on Oct. 28, 2021, an application claiming the benefit of priority to Chinese Patent Application No. 202110301734.3 filed on Mar. 22, 2021 filed in the National Intellectual Property Administration, PRC, the contents of which are incorporated herein in their entirety by reference.

TECHNICAL FIELD

The present disclosure belongs to the field of display technology, and particularly relates to a display panel, a driving method thereof and a display device.

BACKGROUND

A rotational display device includes a plurality of pixel units arranged in an array, may rotate at a specific angular speed by taking a line which is parallel to the columns of the pixel units and passes through the rotational display screen as an axis. Each rotation of a specific angle corresponds to an electronic frame, and the rotational display device displays different images in different electronic frames so as to implement stereoscopic display.

SUMMARY

The present disclosure at least partially solves the problem that the transmission bandwidth required in the display process of the existing rotational display device is large, and provides a display panel capable of reducing the transmission bandwidth required in the display process.

The technical solution adopted for solving the technical problem of the present disclosure is a display panel, including: a plurality of pixel units arranged in an array, each pixel unit including at least two sub-pixels; and a plurality of pixel driving chips in one-to-one correspondence with the plurality of pixel units, the pixel driving chip being configured to provide a driving signal to a corresponding pixel unit.

In some embodiments, the display panel further includes: a plurality of gate lines, each row of the plurality of pixel driving chips corresponding to a respective one of the gate lines; a plurality of data lines, each column of the plurality of pixel driving chips corresponding to at least one data line; and a control component coupled to the plurality of pixel driving chips through the gate lines and the data lines and configured to provide a driving signal to the pixel driving chip through the gate line and the data line.

In some embodiments, each of the pixel driving chips has code information; and the control component includes: a selection subcomponent configured to select a specific pixel driving chip according to the code information of the pixel driving chip so that the control component provides the driving signal to the specific pixel driving chip, wherein the pixel unit corresponding to the specific pixel driving chip is a pixel unit that requires the driving signal.

In some embodiment, the display panel further includes an analog switch component coupled between the control component and the gate lines, and configured to provide a switch signal to the gate line in response to a signal of the control component.

In some embodiments, the display panel further includes a power supply component respectively coupled to the control component and the analog switch component and configured to provide a power supply signal to the control component and the analog switch component.

In some embodiment, the plurality of pixel driving chips are divided into at least two portions having a same number of rows, a number of signal output lines of the analog switch component is the same as a number of the gate lines corresponding to any of the at least two portions, and the gate lines corresponding to a plurality of rows of pixel driving chips in any of the at least two portions are in one-to-one correspondence with the signal output lines.

In some embodiments, a plurality of columns of pixel driving chips in each of the at least two portions are in one-to-one correspondence with the data lines, and the pixel driving chips in different portions are coupled to different data lines.

In some embodiments, the plurality of pixel driving chips are divided into a first portion and a second portion having a same number of rows, and the gate line corresponding to an n-th row of the pixel driving chips in the first portion and the gate line corresponding to an n-th row of the pixel driving chips in the second portion are coupled to a same signal output line.

In some embodiment, each of the pixel units includes three sub-pixels.

In some embodiment, the three sub-pixels in each of the pixel units are a red sub-pixel, a green sub-pixel, and a blue sub-pixel, respectively.

In some embodiment, the sub-pixel is a micro LED.

In some embodiments, the display panel further includes a rotating shaft parallel to a column direction of the pixel units, wherein the display panel is rotatable around an axis of the rotating shaft to implement stereoscopic display.

The technical solution adopted for solving the technical problem of the present disclosure is a method for driving a display panel, the method being based on the display panel described above, and the method includes: providing the driving signal to a corresponding pixel unit through the pixel driving chip to implement display of the display panel.

In some embodiments, providing the driving signal to the corresponding pixel unit through the pixel driving chip to implement display of the display panel includes: obtaining a specific pixel unit according to display information of the pixel units in an n-th frame, wherein the specific pixel unit is a pixel unit which requires the driving signal in a (n+1)-th frame, and the pixel driving chip corresponding to the specific pixel unit is a specific pixel driving chip; acquiring code information of the specific pixel driving chip; and inputting the driving signal to the specific pixel driving chip according to the code information.

In some embodiments, obtaining the specific pixel unit according to the display information of the pixel units in the n-th frame includes: obtaining the specific pixel unit according to display states of the pixel units in the n-th frame by adopting a frame difference method.

In some embodiments, the method further includes, before obtaining the specific pixel unit according to the display information of the pixel units in the n-th frame, acquiring the display information of the pixel units in the n-th frame.

In some embodiments, the method further includes, before acquiring the display information of the pixel units in the n-th frame, encoding the plurality of pixel driving chips, such that each pixel driving chip has respective code information.

In some embodiments, the driving signal includes the code information of the pixel driving chip and the display information of the pixel unit corresponding to the pixel driving chip.

The technical solution adopted for solving the technical problem of the present disclosure is a display device, including the display panel described above, wherein the display device is a stereoscopic rotational display device.

BRIEF DESCRIPTION OF DRAWINGS

The accompanying drawings, which constitute a part of the specification, are to provide a further understanding of the present disclosure, and are to explain the present disclosure together with the detail description of embodiments, and do not limit the present disclosure. In the drawings.

REFERENCE NUMERALS

Figure 1:
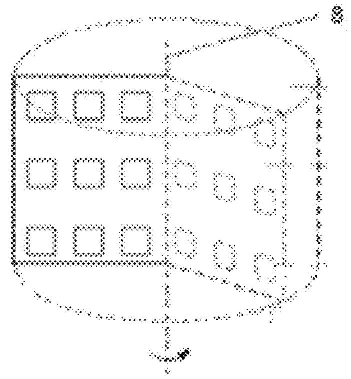
FIG. 1 is a schematic structural diagram of a display panel according to an embodiment of the present disclosure.

1—pixel unit; 10—sub-pixel; 2—pixel driving chip; 3—gate line; 4—data line; 5—control component; 6—analog switch component; 61—signal output line; 7—power supply component; 8—rotating shaft; a—first portion; b—second portion.

DETAIL DESCRIPTION OF EMBODIMENTS

In order to make the technical solutions of the present disclosure better be understood by those skilled in the art, the present disclosure is further described in detail with reference to the accompanying drawings and the detailed description below.

The present disclosure will be described in more detail below with reference to the accompanying drawings. Like elements are denoted by like reference numerals throughout the drawings. For purposes of clarity, the portions in the drawings are not drawn to scale. Moreover, certain well-known elements may not be shown in the drawings.

In the following description, many specific details are set forth, such as structures, materials, sizes, processing processes and processing techniques of components, in order to provide a more thorough understanding of the present disclosure. However, as will be understood by those skilled in the art, the present disclosure may be implemented without these specific details.

Figure 2:
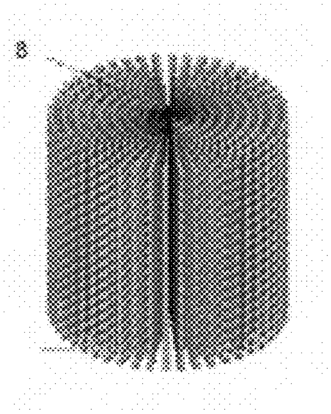
FIG. 2 is a schematic structural diagram of a display panel according to an embodiment of the present disclosure.

As shown in FIG. 1 and FIG. 2, a rotational stereoscopic display is a display technology of true three-dimensional display, which implements the effect of true three-dimensional display by addressing voxels in space in combination with the principle of persistence of vision of human eyes. Specifically, the rotational display panel includes a plurality of pixel units arranged in an array, may rotate at a specific angular speed by taking a line which is parallel to the columns of the pixel units and passes through the rotational display screen as a rotating shaft. Each rotation of a specific angle corresponds to an electronic frame, the rotational display device displays different images in different electronic frames, and a cylindrical display space is formed in a very short time, so as to implement stereoscopic display (three-dimensional display of a model) in combination with principle of persistence of vision of human eyes.

As shown in FIG. 1 and FIG. 2, the main parameters of the rotational display panel include body frame, body frame frequency, electronic frame, and electronic frame frequency. The body frame represents that the rotational display panel make a full revolution, namely rotates for 360 degrees, such that a 3D model image is refreshed; the body frame frequency represents the number of refreshed body frames within one second, namely the number of turns of the rotational display panel within one second; the electronic frame represents an image displayed at every rotation of a particular angle in a body frame; the electronic frame frequency represents the number of electronic frames refreshed in one second, i.e., the screen refresh rate.

Figure 3:
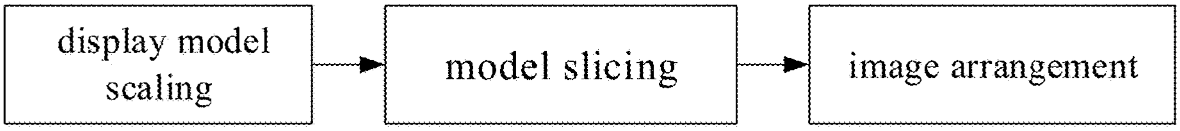
FIG. 3 is a schematic diagram illustrating display principle of a display panel according to an embodiment of the present disclosure.

As shown in FIG. 3, the process of generating a display model for stereoscopic display of a rotational display panel specifically includes the following steps: 1. display model scaling: drawing a 3D model by using modeling software, and scaling the 3D model in combination with the actual size of the cylindrical display space; 2. model slicing: rotating the rotational display panel to different angles, and respectively slicing the 3D model at the different angles to obtain slice images, namely images containing the model profile; 3. image arrangement: arranging all the slice images according to the rotated angles to obtain an image sequence. The rotational display panel displays the images according to the sequence in the rotation process.

In a rotational display panel in the related art, the rotational display panel is formed by a plurality of display units (sub-pixels) arranged in an array, and the display units are driven by a source drive chip and a gate drive chip, so that the rotational display panel generates different display images in different electronic frames, so as to implement stereoscopic display.

For example, the rotational display panel has 96×96 display units therein. The body frame frequency is 30 Hz; and a total of 180 electronic frames are refreshed in a body frame, namely the display panel refreshes the display image once every 2 degrees. In this case, the electronic frame frequency (or screen refresh rate) is: 30 Hz*180=5400 Hz. If one display unit is turned on at 16-bit grayscale, the transmission bandwidth required to display the image is: 16 bit*(96*96)*5400 Hz=0.7962624 Gbps. It can be seen that the amount of display data required by the rotational display panel during the display is very large.

In order to further improve the display effect of the rotational display panel, and implement color display, the resolution of the display panel is 100*200; the color level of the pixel point is 16 bit*3(RGB); the body frame frequency is 60 Hz; the number of the electronic frames is 360; the refresh rate of the panel is 60 Hz*360=21600 Hz; the transmission bandwidth is (16 bit*3)*(100*200)*21600 Hz=20.736 Gbps. If a single driving chip (Driver IC) operates with a transmission rate of 16 Mbps, 20.736

Figure 4:
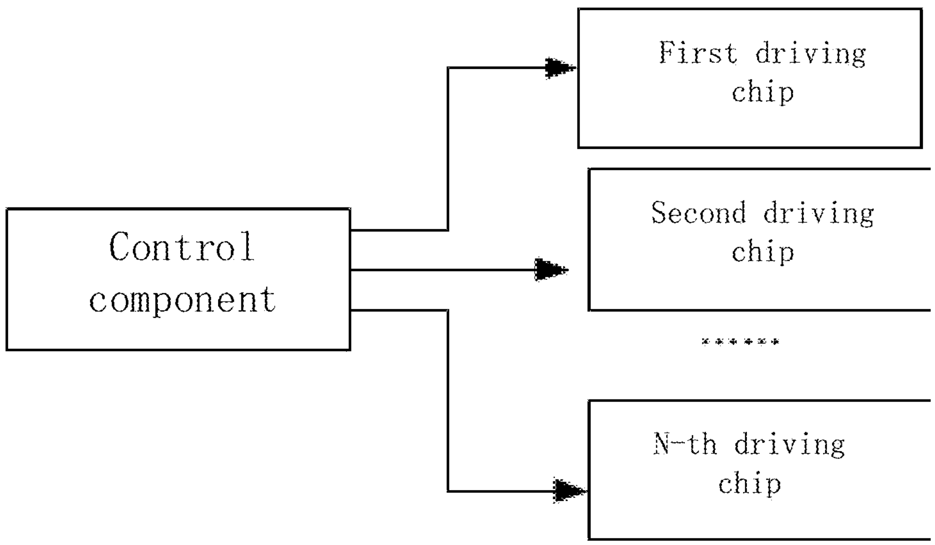
FIG. 4 is a schematic structural diagram of a display panel according to an embodiment of the present disclosure.

Gbps/16 Mbps=1296 driving ICs are required in total, as shown in FIG. 4, which is difficult to implement in the rotational display panel.

Aiming at the problem that the transmission bandwidth required by the display data is large in the rotational display panel, embodiments of the present disclosure provide the following technical solutions.

Figure 5:
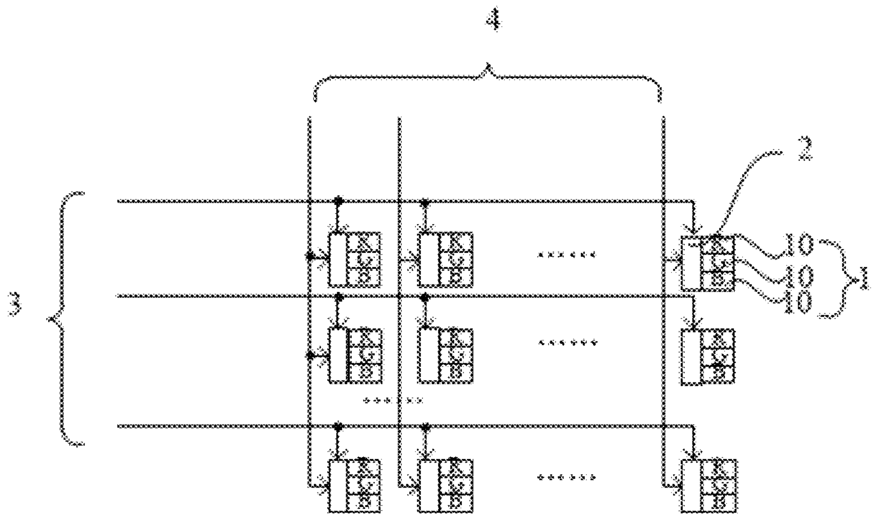
FIG. 5 is a schematic structural diagram of pixel units and pixel driving chips of a display panel according to an embodiment of the present disclosure.

In a first aspect, as shown in FIG. 5, the present embodiment provides a display panel, including: a plurality of pixel units 1 and a plurality of pixel driving chips 2. Each of the plurality of pixel units 1 includes at least two sub-pixels 10, the plurality of pixel driving chips 2 are arranged in an array, the pixel driving chips 2 are in one-to-one correspondence with the pixel units 1, and the pixel driving chip 2 is configured to provide a driving signal to a corresponding pixel unit 1.

The pixel unit 1 is a structure configured to emit display light in a display panel; the pixel driving chip 2 is a structure configured to provide the driving signal to the pixel unit 1 in the display panel to enable the pixel unit 1 to emit the display light. The plurality of pixel units 1 are arranged in an array, and each pixel unit 1 includes at least two sub-pixels 10. It should be noted that, in the display process of the display panel, each sub-pixel 10 requires a corresponding driving signal.

Since the pixel units 1 are in one-to-one correspondence with the pixel driving chips 2, each pixel driving chip 2 is only required to provide the driving signal to the corresponding pixel unit 1. That is, in the display panel, it is required to provide the driving signal to the pixel driving chip 2, so that the pixel driving chip 2 transmits the driving signal to the corresponding pixel unit 1, and the at least two sub-pixels 10 in the pixel unit 1 may obtain the respective driving signal, thereby implementing the driving process of the display panel.

It should be noted that, in the display panel in the related art, as shown in FIG. 4, since each sub-pixel requires the driving signal corresponding to the sub-pixel in the process of implementing the display of the display panel, it is required to provide driving chips of the number corresponding to the number of the sub-pixels, and the sub-pixels are in one-to-one correspondence with the driving chips, so that each driving chip provides a driving signal to the corresponding sub-pixel to implement the display. However, the number of sub-pixels in the display panel is often large, which results in a large number of driving chips, making the fabrication of the display panel difficult, especially for a display panel having high resolution.

In the display panel of the embodiment, each of the pixel driving chips 2 which are in one-to-one correspondence with the pixel units 1 provides the driving signal to the at least two sub-pixels 10 in the corresponding pixel unit 1, that is, one pixel driving chip 2 corresponds to at least two sub-pixels 10. Compared with the display panel in the related art, the number of the pixel driving chips 2 of the display panel in the embodiment is not required to be the same as the number of the sub-pixels 10, thereby greatly reducing the difficulty in fabricating the display panel.

It should be noted that, the display panel of the present embodiment may be applied to different types of display panels such as a liquid crystal display panel, an organic light emitting diode (OLED) display panel, and a rotational display panel, and is particularly suitable for the rotational display panel. The following description will be given by taking a case where the display panel of the present embodiment is a rotational display panel as an example.

Specifically, in some embodiments, the display panel of the present application further includes: a rotating shaft 8. The rotating shaft 8 is parallel to the column direction of the pixel units 1, and the display panel may rotate around an axis where the rotating shaft 8 is located to implement stereoscopic display.

As shown in FIG. 1 and FIG. 2, that is, the rotational display device may rotate at a specific angular speed by taking a line which is parallel to the columns of the pixel units and passes through the rotational display screen as an axis, each rotation of a specific angle corresponds to one electronic frame, the rotational display device displays different images in different electronic frames, and a cylindrical display space is formed in a very short time, so as to implement stereoscopic display in combination with principle of persistence of vision of human eyes.

In some embodiments, each pixel unit 1 includes three sub-pixels 10.

The plurality of sub-pixels 10 are also arranged in an array. Each sub-pixel 10 may display a specific color, and each pixel unit 1 generates colored light by adjusting the brightness of the sub-pixel 10, so as to implement color display of the display panel, thereby improving user experience.

Specifically, as shown in FIGS. 4 and 5, the three sub-pixels 10 in each pixel unit 1 are a red sub-pixel R, a green sub-pixel G, and a blue sub-pixel B, respectively.

Figure 6:
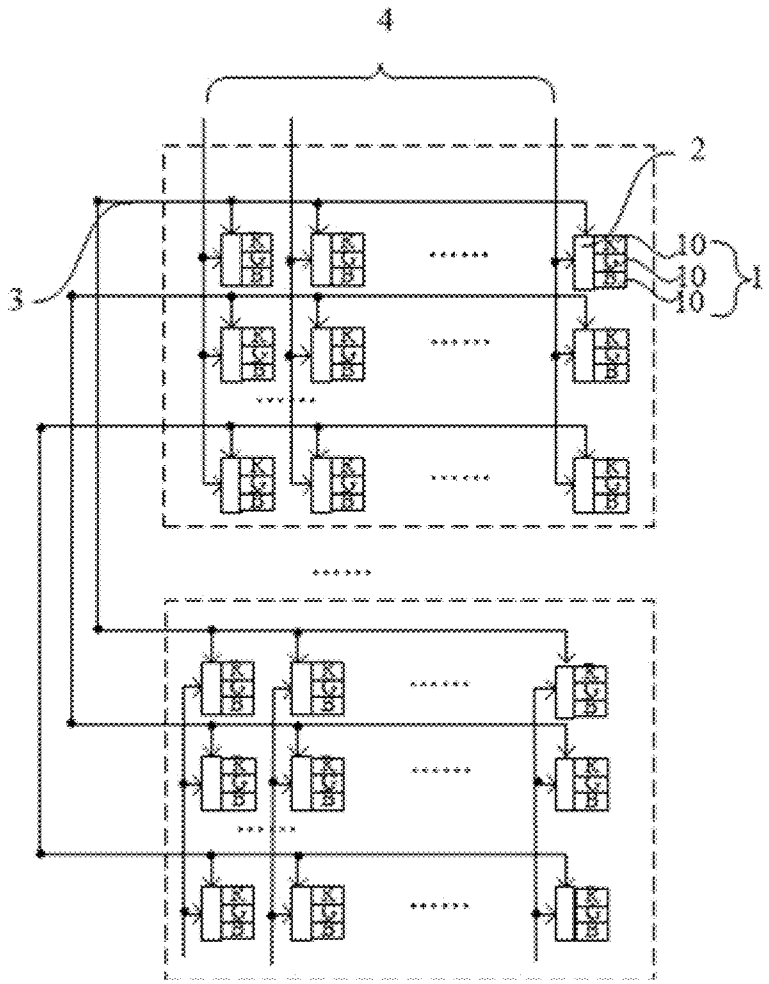
FIG. 6 is a schematic structural diagram of pixel units and pixel driving chips of a display panel according to an embodiment of the present disclosure.
Figure 7:
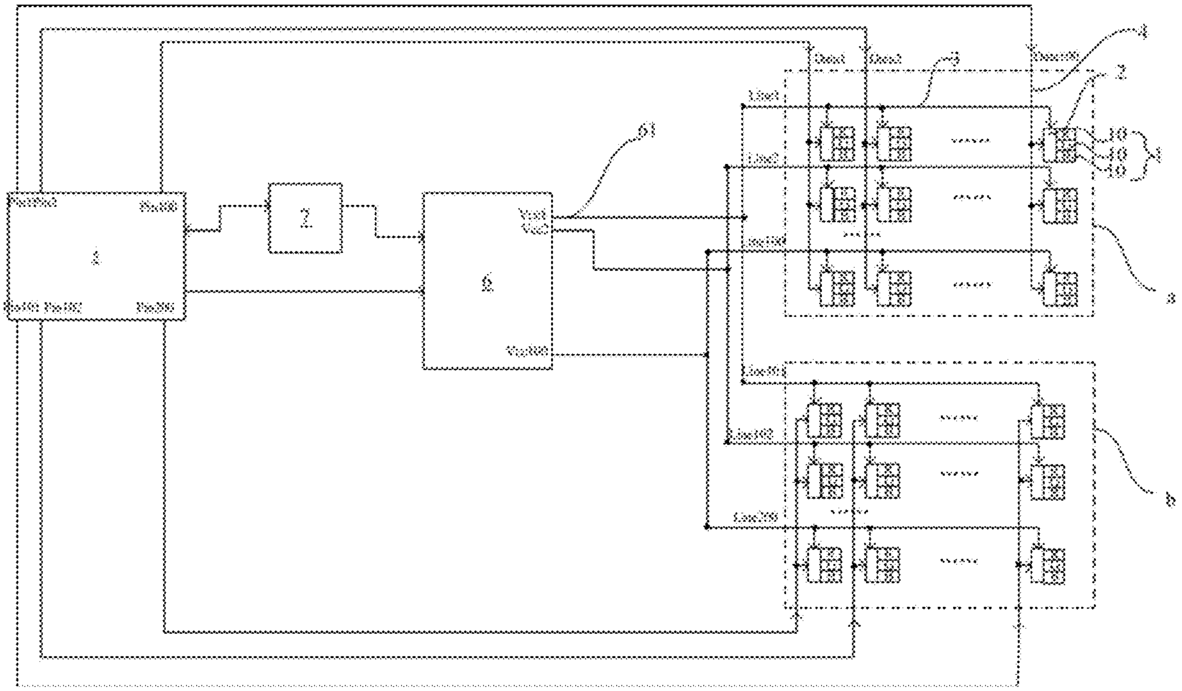
FIG. 7 is a schematic structural diagram of a display panel according to an embodiment of the present disclosure.

It should be noted herein that the color of each sub-pixel 10 in the embodiment of the present disclosure may be determined according to the color of the light emitting device in the sub-pixel 10. For example, if the light emitted by the light emitting device in the sub-pixel 10 is red light, the sub-pixel 10 is referred to as a red sub-pixel R. Of course, if the colors of light emitted by the light emitting devices in the display substrate are the same, for example, the light emitted by each light emitting device is white light, the colors of the sub-pixels are determined based on the colors of the color filters in the color filter substrate opposite to the display panel. For example, if the color of the color filter in the color filter substrate corresponding to a certain sub-pixel 10 is red, the sub-pixel 10 is referred to as a red sub-pixel R. As shown in FIGS. 5 to 7, the sub-pixels 10 in the same row have the same color, and every three adjacent sub-pixels 10 in the column direction form a pixel unit 1, and the three sub-pixels 10 in each pixel unit are respectively a red sub-pixel R, a green sub-pixel G, and a blue sub-pixel B.

In some embodiments, the sub-pixels 10 are micro LEDs.

That is to say, each pixel unit 1 includes three micro LEDs. Compared with the LED in the related art, the volume of micro LED is smaller, which may effectively reduce the density of the display units, further facilitates the formation of the display panel of high resolution, greatly reduce the graininess presented on the display screen, and further improve user experience.

In some embodiments, as shown in FIG. 7, the display panel of the present disclosure further includes: a plurality of gate lines 3, a plurality of data lines 4, and a control component 5. A row of pixel driving chips 2 corresponds to one gate line 3; a column of pixel driving chips 2 corresponds to at least one data line 4; and the control component 5 is coupled to the pixel driving chips 2 through the gate lines 3 and the data lines 4, and is configured to provide driving signals to the pixel driving chips 2 through the gate lines 3 and the data lines 4.

The gate lines 3 intersect with the data lines 4, and the pixel driving chip 2 and the pixel unit 1 are defined at the intersection position. The pixel driving chips 2 in the same row are coupled to the same gate line 3, and the pixel driving chips 2 in the same column are coupled to at least one data line 4. Specifically, as shown in FIG. 7, the data line 4 coupled to the first column of pixel driving chips 2 is referred to as Data1, the data line 4 coupled to the second column of pixel driving chips 2 is referred to as Data2, and so on. Similarly, the gate line 3 coupled to the first row of pixel driving chips 2 is referred to as Line1, the gate line 3 coupled to the second row of pixel driving chips 2 is referred to as Line2, and so on.

The control component 5 may provide the driving signals to the pixel driving chips 2 through the gate lines 3 and the data lines 4, such that the pixel driving chips 2 write the driving signals into the respective pixel units 1 to implement display of the display panel.

In some embodiments, each pixel driving chip 2 has code information (or a code number). The control component 5 includes: a selection subcomponent configured to select a specific pixel driving chip 2 according to the code information of the pixel driving chips 2, so that the control component 5 provides the driving signal to the specific pixel driving chip 2. The pixel unit 1 corresponding to the specific pixel driving chip 2 is the pixel unit 1 that requires the driving signal.

That is to say, the pixel driving chip 2 has coding and decoding functions of the chip, thereby implementing coding of each pixel unit 1. Meanwhile, after each pixel unit 1 has been encoded, the selection subcomponent of the control component 5 may select the specific pixel unit 1 corresponding to the specific pixel driving chip 2 according to the code information of each pixel unit 1, and provide the driving signal to the specific pixel unit 1 through the specific pixel driving chip 2. Specifically, the control component 5 may store display information of the pixel units 1 in the n-th frame in advance, so that the frame difference method can be performed in the (n+1)-th frame, that is, the specific pixel unit 1 in the (n+1)-th frame may be obtained according to the display states of the pixel units 1 in the n-th frame.

It should be noted that, the specific pixel unit 1 is a pixel unit 1 whose display content in the current electronic frame is different from that in the previous electronic frame, that is, to implement the display of the current electronic frame, it is only required to provide the selected specific pixel unit with the driving signal in the current electronic frame.

In the display panel in the related art, in the process of implementing display of the display panel, signals are input to all display units in each electronic frame to implement display. Therefore, a larger transmission bandwidth is required in the driving process of the display panel, in order to improve the display effect of the display panel.

In the display panel of the embodiment, firstly, the pixel units 1 that have been encoded are decoded, then, specific pixel units 1 are selected from the pixel units 1, and the driving of the current electronic frame can be implemented only by providing the driving signals to the specific pixel units 1 through the specific pixel driving chips 2, thereby implementing the display of the electronic frame. Compared with the display panel in the related art, the display panel of the embodiment has the advantages that the data transmitted in the driving process can be greatly reduced, only effective data can be transmitted, the requirement of the display panel on transmission bandwidth can be greatly lowered, and the display effect of the display panel can be greatly improved.

In some embodiments, the display panel of the present application further includes: an analog switch component 6 coupled between the control component 5 and the gate lines 3, and the analog switch component 6 is configured to provide a switch signal to the gate line 3 in response to a signal of the control component 5.

That is, the analog switch component 6 outputs the switch signal to each gate line 3 by receiving a signal output from the control component 5. It should be noted that the switch signal is a signal for controlling whether each pixel driving chip 2 is electrically connected to the corresponding data line 4, so as to control whether the data line 4 may provide a display signal to the corresponding pixel driving chip 2. Specifically, in each electronic frame, an ON signal is sequentially provided to the respective gate lines 3 staring from the first gate line 3, so that respective rows of pixel driving chips 2 sequentially electrically connect with the corresponding data lines 4, and the data lines 4 provide display signals to the pixel driving chips 2 according to the timing sequence of the ON signals, so as to implement the display of the electronic frame.

In some embodiments, the display panel of the present application further includes: a power supply component 7 coupled to the control component 5 and the analog switch component 6, respectively, and configured to provide power signals to the control component 5 and the analog switch component 6.

The power supply component 7 mainly supplies power to the control component 5 and the analog switch component 6 to ensure the normal operation of the control component 5 and the analog switch component 6, so as to ensure the normal operation during the driving process of the display panel.

In some embodiments, the plurality of pixel driving chips 2 include at least two portions having the same number of rows, the number of signal output lines 61 of the analog switch component 6 is the same as the number of gate lines 3 corresponding to any portion of the pixel driving chips 2, and the gate lines 3 corresponding to a plurality of rows of pixel driving chips 2 in any portion of the pixel driving chips 2 are in one-to-one correspondence with the signal output lines.

That is, the number of the gate lines 3 is the same as that of the rows of any portion of the pixel driving chips 2, the plurality of rows of pixel driving chips 2 in any portion of the pixel driving chips 2 are in one-to-one correspondence with the gate lines 3, and the portions of the pixel driving chips 2 are the same in the number of the pixel driving chips 2. In any portion of the pixel driving chips 2, the plurality of rows of pixel driving chips 2 are in one-to-one correspondence the gate lines 3, that is, each gate line 3 may be coupled to one row of pixel driving chips 2 in any portion of the pixel driving chips 2, and one row of pixel driving chips 2 in one portion of the pixel driving chips 2 are coupled to the same gate line 3 as one row of pixel driving chips 2 in another portion of the pixel driving chips 2.

Thus, in the scanning process of the gate lines 3, the portions of the pixel driving chips 2 may be driven simultaneously to reduce the time required for driving each electronic frame, thereby increasing the electronic frame frequency of the display panel to improve the display effect.

In some embodiments, a plurality of columns of pixel driving chips 2 are in one-to-one correspondence with the data lines 4 in each portion of the pixel driving chips 2, and the pixel driving chips 2 in different portions of the pixel driving chips 2 are coupled to different data lines 4.

In order to more accurately select the specific pixel driving chip 2, the pixel driving chips 2 belonging to different portions are coupled to different data lines 4 even though they are positioned in the same column.

It should be noted that the analog switch component 6 may simultaneously input the switch signal to two rows of pixel driving chips 2 located at different portions, so as to ensure the smooth driving process of the display panel.

Specifically, as shown in FIG. 7, the plurality of pixel driving chips 2 are divided into a first portion a and a second portion b having the same number of rows, and the gate line corresponding to the n-th row of pixel driving chips 2 in the first portion a and the gate line corresponding to the n-th row of pixel driving chips 2 in the second portion b are coupled to the same signal output line 61.

That is, the number of rows of the pixel driving chips 2 in the first portion a and the number of rows of the pixel driving chips 2 in the second portion b are the same, and the first row of pixel driving chips 2 in the first portion a and the first row of pixel driving chips 2 in the second portion b are both coupled to the first gate line 3, that is, the first gate line 3 may simultaneously provide the switch signal to the first row of pixel driving chips 2 in the first portion a and the first row of pixel driving chips 2 in the second portion b. The second row of pixel driving chips 2 in the first portion a and the second row of pixel driving chips 2 in the second portion b are both coupled to the second gate line 3, that is, the second gate line 3 may simultaneously provide the switch signal to the second row of pixel driving chips 2 in the first portion a and the second row of pixel driving chips 2 in the second portion b, and so on.

It should be noted that, in the display panel in the related art, respective rows of pixel units are coupled to different gate lines, so in each frame, if the driving time of each row is a, and there are 2n rows of pixel units 1 in total, a total time of 2na is required to complete the driving of each frame.

However in the display panel in this embodiment, if there are n rows of pixel driving chips 2 in each portion, there are two portions (2n rows of pixel driving chips 2 in total), and the time for scanning each row of pixel driving chips 2 is a, the driving time of each electronic frame is na since one gate line 3 may drive two rows of pixel driving chips 2 at the same time. It can be seen that, the connection structure of the gate lines 3 of the embodiment can greatly reduce the driving time of each electronic frame, thereby improving the electronic frame frequency of the display panel and further improving the display effect.

Specifically, as shown in FIG. 7, for the structure of the display panel of the above embodiment, the display panel has 200 data lines 4. 200 pins (Pin) of the control component 5 (FPGA) are coupled to the data lines 4, that is, in the control component 5 (FPGA), 200 pins are used for transmitting display signals. The display panel has 100 gate lines 3, and 100 pins (Pin) of the analog switch component 6 are coupled to the gate lines 3, that is, 100 pins (namely Vcc1-Vcc100) of the analog switch component 6 are used for transmitting switch signals.

Specifically, the control component 5 (FPGA) encodes each pixel driving chip 2 (Pixel IC) as follows: since each data line 4 is coupled to 100 pixel driving chips 2, the code numbers (ID) transmitted by all the data lines 4 are 1 to 100. The final encoding result is: pixel points of the pixel driving chips 2 in the $1^{st}$ row (Line 1) and the pixel driving chips 2 in the $101^{th}$ row (Line 101) are all encoded to be ID1, pixel points of the pixel driving chips 2 in the $2^{nd}$ row (Line 2) and the pixel driving chips 2 in the $102^{th}$ row (Line 102) are all encoded to be ID2, and so on, pixel points of the pixel driving chips 2 in the $100^{th}$ row (Line 100) and the pixel driving chips 2 in the $200^{th}$ row (Line 200) are all encoded to be ID 100.

After the initialization coding is completed, a turned-on process of the pixel units 1 is performed. In the turned-on process, the data format of the display information output by each data line 4 is: code number+grayscale data of the sub-pixel (Chip ID+RGB). When the gate lines 3 (Vcc1-Vcc100) are sequentially enabled, the pixel driving chips 2 (Pixel IC) decode the code numbers (Chip ID) of the corresponding pixel driving chips 2, and only when the decoding result of the pixel driving chip 2 matches the initialization code number, the pixel driving chip 2 receives the data of the set of display information and generates a pulse width modulation signal (PWM), thereby turning on the pixel unit 1.

For example, if the $30^{th}$ and $50^{th}$ pixel units 1 corresponding to the first data line 4 (Data 1) are to be turned on, the display information output by the first data line 4 is: ID30+RGB30 and ID50+RGB50; the gate lines 3 (Vcc1-Vcc100) are sequentially enabled, and only when the gate lines Vcc30 and Vcc50 are enabled, the decoding result matches with the initialization code (ID), and the RGB30 and RGB50 are respectively received by the $30^{th}$ and $50^{th}$ pixel driving chips 2, so the $30^{th}$ and $50^{th}$ pixel units 1 are turned on.

For another example, the display data to be transmitted when one pixel unit 1 is turned on is code number+grayscale data of the sub-pixel (Chip ID+RGB), which occupies 8 bit+16 bit×3=56 bit. If the refresh rate of the display panel is 21600 Hz and the transmission bandwidth of the data line 4 is 16 Mbps, among 100 pixel units 1 coupled to one data line 4, at most 13 pixel units may be turned on in one electronic frame of image. The calculation process is shown in the following formula: 16 Mbps/21600 Hz/56 bit=13.23≈13. This is sufficient for the display panel of the present embodiment. In addition, by research, the transmission bandwidth of the data line 4 can reach 32 Mbps, and thus, the display panel of the embodiment has a large improvement space in the display effect.

It should be noted that the display panel of the present embodiment can also be divided into three portions, four portions, or the like, which are not limited to the above-mentioned cases and can be determined according to the actual requirements of the display panel.

Figure 8:
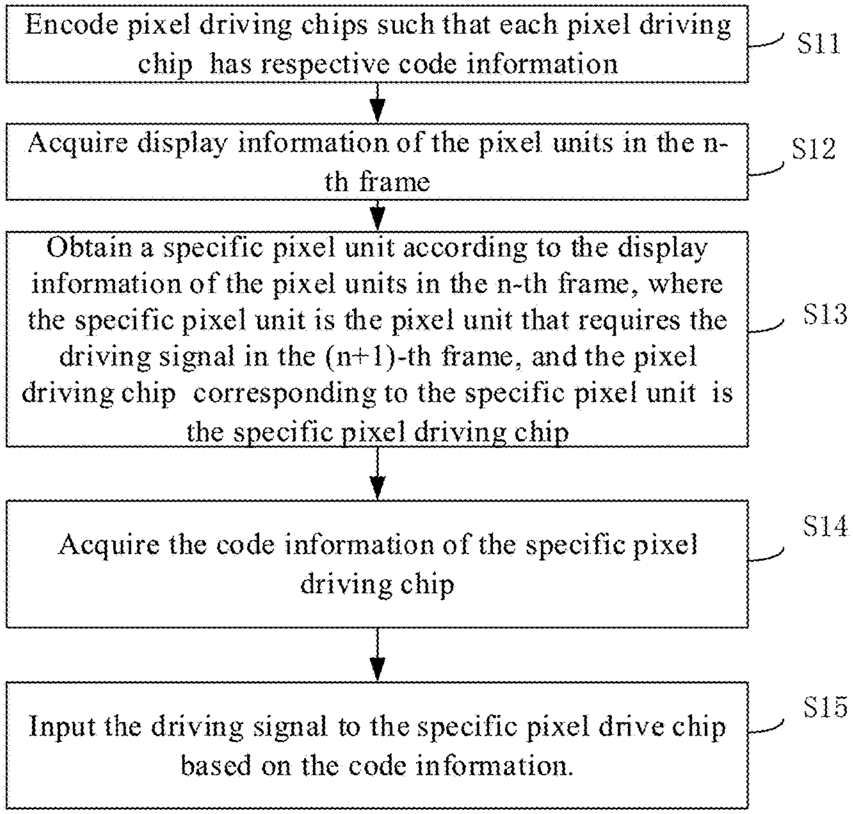
FIG. 8 is a schematic flowchart illustrating a driving method of a display panel according to an embodiment of the present disclosure.

In a second aspect, as shown in FIG. 8, the embodiments provide a driving method of a display panel, which is based on the display panel described above, and the driving method includes providing, by the pixel driving chip 2, a driving signal to the corresponding pixel unit 1 to implement the display of the display panel.

The pixel units 1 are structures configured to emit display light in a display panel, and each pixel unit 1 corresponds to one pixel driving chip 2. The pixel driving chip 2 is a structure configured to provide a driving signal to the pixel unit 1 in the display panel such that the pixel unit 1 emits display light. Each pixel unit 1 includes at least two sub-pixels 10, and it should be noted that, during the display process of the display panel, each sub-pixel 10 requires a driving signal corresponding to the sub-pixel 10.

Since the pixel units 1 are in one-to-one correspondence with the pixel driving chips 2, the pixel driving chip 2 is only required to provide the driving signal to the corresponding pixel unit 1, that is, in the display panel, it is only required to provide the driving signals to the pixel driving chips 2, so that the pixel driving chips 2 transmit the driving signals to the corresponding pixel units 1, and the driving process of the display panel can be implemented.

It should be noted that, in the display panel in the related art, since each sub-pixel 10 requires a driving signal corresponding thereto in the display process of the display panel, it is required to provide driving chips of the number corresponding to the number of the sub-pixels 10, and the sub-pixels 10 are in one-to-one correspondence with the driving chips, so that each driving chip provides a driving signal to the sub-pixel 10 corresponding thereto to implement display. However, the number of sub-pixels 10 in a display panel is often large, which results in a large number of driving chips, thus making the fabrication of the display panel difficult, especially for the display panel having high resolution.

In the driving method of the display panel of the embodiment, each of the pixel driving chips 2 in one-to-one correspondence with the pixel units provides the driving signal to the at least two sub-pixels 10 in the pixel unit 1, that is, one pixel driving chip 2 corresponds to at least two sub-pixels 10. Compared with the display panel in the related art, the number of the pixel driving chips 2 of the display panel in the embodiment is not required to be the same as the number of the sub-pixels 10, thereby greatly reducing the difficulty in fabricating the display panel.

Specifically, providing the driving signal to the corresponding pixel unit 1 by the pixel driving chip 2 to implement the display of the display panel at least includes: Step S11 to Step S15.

In Step S11, the plurality of pixel driving chips 2 are encoded such that each pixel driving chip 2 has a respective code number.

It should be noted that, the plurality of pixel driving chips 2 may be divided by row into a first portion a and a second portion b with the same number of rows, and the n-th row of pixel driving chips 2 in the first portion a and the n-th row of pixel driving chips 2 in the second portion b are coupled to the same gate line 3.

Specific encoding rules for the structure of the display panel are as follows. If each data line 4 is coupled to 100 pixel driving chips 2, the code numbers (ID) transmitted by all the data lines 4 are: 1 to 100. The plurality of gate lines 3 are Vcc1 to Vcc100. The final encoding result is: pixel points of the pixel driving chips 2 in the $1^{st}$ row (Line 1) and the pixel driving chips 2 in the $101^{th}$ row (Line 101) are all encoded to be ID1, pixel points of the pixel driving chips 2 in the $2^{nd}$ row (Line 2) and the pixel driving chips 2 in the $102^{th}$ row (Line 102) are all encoded to be ID2, and so on, pixel points of the pixel driving chips 2 in the $100^{th}$ row (Line 100) and the pixel driving chips 2 in the $200^{th}$ row (Line 200) are all encoded to be ID100.

In Step S12, the display information of the pixel units 1 in the n-th frame is acquired.

That is, the control component 5 of the display panel may store the display information of the pixel units 1 in the n-th frame in advance. The display information includes grayscale data of each sub-pixel 10 in the pixel unit 1.

In Step S13, a specific pixel unit 1 is obtained according to the display information of the pixel units 1 in the n-th frame, where the specific pixel unit 1 is the pixel unit 1 that requires the driving signal in the (n+1)-th frame, and the pixel driving chip 2 corresponding to the specific pixel unit 1 is the specific pixel driving chip 2.

Specifically, the specific pixel unit 1 is obtained according to the display states of the pixel units 1 in the n-th frame by using a frame difference method.

That is, by comparing the display information of the pixel units 1 in the (n+1)-th frame with the display information of the pixel units 1 in the n-th frame, the pixel unit 1 in which the display data is changed in the (n+1)-th frame relative to that in the n-th frame is selected as the specific pixel unit 1.

Specifically, the selection of the specific pixel driving chip 2 follows the following table (shown are different display states of the pixel units 1 (five kinds of pixel units 1 numbered by the serial numbers) in the n-th frame and the (n+1)-th frame respectively, and "no data transmission is required" indicates that the corresponding pixel unit 1 in the (n+1)-th frame is not a specific pixel unit, and the rest of the pixel units 1 are specific pixel units).

| Serial number | n-th frame | (n + 1)-th frame | data transmission required |
|---|---|---|---|
| 1 | Turn off | Turn on (r, g, b) | ID(x) + RGB(r, g, b) |
| 2 | Turn on (r, g, b) | Turn off | ID(x) + RGB(0, 0, 0) |
| 3 | Turn on (r1, g1, b1) | Turn on (r2, g2, b2) | ID(x) + RGB(r2, g2, b2) |
| 4 | Turn on (r, g, b) | Turn on (r, g, b) | no data transmission is required |
| 5 | Turn off | Turn off | no data transmission is required |

In Step S14, the code information of the specific pixel driving chip 2 is acquired.

In Step S15, the driving signal is input to the specific pixel drive chip 2 based on the code information.

In this case, after the initialization coding is completed, the turned-on process of the pixel units 1 is performed. In the subsequent turned-on process, the data format of the display information transmitted and output by each data line 4 is: code number+grayscale data of the sub-pixel 10 (Chip ID+RGB). When the gate lines 3 (Vcc1-Vcc100) are sequentially enabled, the pixel driving chips 2 (Pixel IC) decode the code numbers (Chip ID) of the corresponding pixel driving chips 2, and only when the decoding result of the pixel driving chip 2 matches the initialization code number, the pixel driving chip 2 receives the data of the set of display information and generates a pulse width modulation signal (PWM), thereby turning on the pixel unit 1.

For example, if the $30^{th}$ and $50^{th}$ pixel units 1 corresponding to the first data line 4 (Data 1) are to be turned on, the display information output by the first data line 4 is: ID30+RGB30 and ID50+RGB50; the gate lines 3 (Vcc1-Vcc100) are sequentially enabled, and only when the gate lines Vcc30 and Vcc50 are enabled, the decoding result matches with the initialization code (ID), and the RGB30 and RGB50 are respectively received by the $30^{th}$ and $50^{th}$ pixel driving chips 2, so the $30^{th}$ and $50^{th}$ pixel units 1 are turned on.

In the driving method of the display panel of the embodiment, firstly, the pixel units 1 that have been encoded are decoded, then, specific pixel units 1 are selected from the pixel units 1, and the driving of the electronic frame can be implemented only by providing the driving signals to the specific pixel units 1 through the specific pixel driving chips 2, so as to implement the display of the electronic frame. Compared with the display panel in the related art, the display panel of the embodiment has the advantages that the data transmitted in the driving process can be greatly reduced in the driving process, only effective data can be transmitted, the requirement of the display panel on transmission bandwidth can be greatly reduced, and the display effect of the display panel can be greatly improved.

In a third aspect, the embodiments provide a display device, which includes the display panel described above, and the display device is a stereoscopic rotational display device.

Specifically, the display device may include a plurality of pixel units arranged in an array, can rotate at a specific angular speed by taking a line which is parallel to the columns of the pixel units and passes through the rotational display screen as a rotating shaft. Each rotation of a specific angle corresponds to an electronic frame, the rotational display device displays different images in different electronic frames, and a cylindrical display space is formed in a very short time, so as to implement stereoscopic display in combination with principle of persistence of vision of human eyes.

In the display device of the embodiment, each of the pixel driving chips 2 in one-to-one correspondence with the pixel units 1 provides the driving signal to at least two sub-pixels 10 in the corresponding pixel unit 1, that is, one pixel driving chip 2 corresponds to at least two sub-pixels 10. Compared with the display panel in the related art, the number of the pixel driving chips 2 of the display panel in the embodiment is not required to be the same as the number of the sub-pixels 10, thereby greatly reducing the difficulty in fabricating the display panel.

In addition, in the display device of this embodiment, firstly, the pixel units 1 that have been encoded are decoded, then, specific pixel units 1 are selected from the pixel units 1, and the driving of the electronic frame can be implemented only by providing the driving signals to the specific pixel units 1 through the specific pixel driving chips 2, so as to implement the display of the electronic frame. Compared with the display panel in the related art, the display panel of the embodiment has the advantages that the data transmitted in the driving process can be greatly reduced in the driving process, only effective data can be transmitted, the requirement of the display panel on transmission bandwidth can be greatly reduced, and the display effect of the display panel can be greatly improved.

It should be noted that, herein, the relational term such as “first”, “second”, or the like is used solely to distinguish one entity or operation from another entity or operation without necessarily requiring or implying any actual such relationship or order between such entities or actions. Also, the term “include”, “comprise” or any other variation thereof, is intended to cover a non-exclusive inclusion, so that a process, method, article, or apparatus that includes a list of elements does not only include these elements but may include other elements not expressly listed or inherent to such process, method, article, or apparatus. Without further limitation, an element defined by the phrase “comprising . . . ” does not exclude the presence of other identical elements in the process, method, article, or apparatus that includes the element.

In accordance with embodiments of the present disclosure, as set forth above, these embodiments do not describe all the details in detail, nor do they limit the present disclosure to the specific embodiments described. Obviously, many modifications and variations are possible according to above description. The embodiments are chosen and described in order to best explain the principles of the present disclosure and the practical application, to thereby enable others skilled in the art to best utilize the present disclosure and modify the use based on the present disclosure. The present disclosure is limited only by the claims and their full scope and the equivalents.

What is claimed is:

1. A display panel, comprising:

a plurality of pixel units arranged in an array, each pixel unit comprising at least two sub-pixels; and a plurality of pixel driving chips in one-to-one correspondence with the plurality of pixel units, the pixel driving chip being configured to provide a driving signal to a corresponding pixel unit;

a plurality of gate lines, each row of the plurality of pixel driving chips corresponding to a respective one of the gate lines;

a plurality of data lines, each column of the plurality of pixel driving chips corresponding to at least two data line; and a control component coupled to the plurality of pixel driving chips through the gate lines and the data lines, wherein the plurality of the pixel driving chips are divided into at least a first portion and a second portion having a same number of rows, and the pixel driving chips in the first portion and located in one column and the pixel driving chips in the second portion and located in the same column as that of the pixel driving chips in the first portion located in the one column are connected to different data lines, wherein the control component is configured to:

obtain a specific pixel unit according to display information of the pixel units in an n-th frame, wherein the specific pixel unit is a pixel unit which requires the driving signal in a (n+1)-th frame, and the pixel driving chip corresponding to the specific pixel unit is a specific pixel driving chip, where n is a positive integer;

acquire code information of the specific pixel driving chip; and input the driving signal to the specific pixel driving chip according to the code information.

2. The display panel according to claim 1, further comprising:

an analog switch component coupled between the control component and the gate lines, wherein the analog switch component is configured to provide a switch signal to the gate line in response to a signal of the control component.

3. The display panel according to claim 2, further comprising:

a power supply component respectively coupled to the control component and the analog switch component and configured to provide a power supply signal to the control component and the analog switch component.

4. The display panel according to claim 2, wherein a number of signal output lines of the analog switch component is the same as a number of the gate lines corresponding to any of the at least the first portion and the second portion, and the gate lines corresponding to any of the at least the first portion and the second portion of the plurality pixel driving chips are in one-to-one correspondence with the signal output lines.

5. The display panel according to claim 4, wherein the pixel driving chips in each of the at least the first portion and the second portion are in columns in one-to-one correspondence with the data lines, and the pixel driving chips in different portions are coupled to different data lines.

6. The display panel according to claim 4, wherein the plurality of pixel driving chips are divided into a first portion and a second portion having a same number of rows, and the gate lines corresponding to an n-th row of the pixel driving chips in the first portion and the gate lines corresponding to an n-th row of the pixel driving chips in the second portion are coupled to a same signal output line, where n is a positive integer.

7. The display panel according to claim 1, wherein each of the pixel units comprises three sub-pixels.

8. The display panel according to claim 7, wherein the three sub-pixels in each of the pixel units are a red sub-pixel, a green sub-pixel, and a blue sub-pixel, respectively.

9. The display panel according to claim 1, wherein the sub-pixel is a micro LED lamp.

10. The display panel according to claim 1, further comprising: a rotating shaft parallel to a column direction of the pixel units, wherein the display panel enables to rotate around an axis of the rotating shaft to implement stereoscopic display.

11. A display device, comprising the display panel according to claim 1, wherein the display device is a stereoscopic rotational display device.

12. The display panel according to claim 1, wherein the pixel unit that requires the driving signal is a pixel unit whose display content in a current electrical frame is different from that in a previous electrical frame.

13. A method for driving a display panel comprising:

a plurality of pixel units arranged in an array, each pixel unit comprising at least two sub-pixels; and a plurality of pixel driving chips in one-to-one correspondence with the plurality of pixel units, the pixel driving chip being configured to provide a driving signal to a corresponding pixel unit, wherein the method comprises providing a driving signal to a corresponding pixel unit through the pixel driving chip to implement display of the display panel, wherein providing the driving signal to the corresponding pixel unit through the pixel driving chip to implement display of the display panel comprises:

obtaining a specific pixel unit according to display information of the pixel units in an n-th frame, wherein the specific pixel unit is a pixel unit which requires the driving signal in a (n+1)-th frame, and the pixel driving chip corresponding to the specific pixel unit is a specific pixel driving chip, where n is a positive integer;

acquiring code information of the specific pixel driving chip; and inputting the driving signal to the specific pixel driving chip according to the code information.

14. The method for driving the display panel according to claim 13, wherein obtaining the specific pixel unit according to the display information of the pixel units in the n-th frame comprises:

obtaining the specific pixel unit according to a display state of the pixel unit in the n-th frame by adopting a frame difference method.

15. The method for driving the display panel according to claim 13, wherein the method further comprises, before obtaining the specific pixel unit according to the display information of the pixel units in the n-th frame, acquiring display information of the pixel unit in the n-th frame.

16. The method for driving the display panel according to claim 15, further comprising: before acquiring the display information of the pixel unit in the n-th frame, encoding the plurality of pixel driving chips, such that each pixel driving chip has respective code information.

17. The method for driving the display panel according to claim 15, wherein the driving signal comprises the code information of the pixel driving chip and the display information of the pixel unit corresponding to the pixel driving chip.

* * * * *